United States Patent
Tanaka

(10) Patent No.: US 9,230,205 B2
(45) Date of Patent: Jan. 5, 2016

(54) IMAGE FORMING APPARATUS, NON-TRANSITORY COMPUTER-READABLE RECORDING MEDIUM STORING AN IMAGE FORMING PROGRAM, AND IMAGE FORMING METHOD

(71) Applicant: KYOCERA Document Solutions Inc., Osaka (JP)

(72) Inventor: Toshihiko Tanaka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 44 days.

(21) Appl. No.: 14/134,671

(22) Filed: Dec. 19, 2013

(65) Prior Publication Data

US 2014/0176971 A1 Jun. 26, 2014

(30) Foreign Application Priority Data

Dec. 26, 2012 (JP) ................................ 2012-283734

(51) Int. Cl.
  *G06K 15/00* (2006.01)
  *G06K 15/02* (2006.01)
(52) U.S. Cl.
  CPC ........ *G06K 15/4065* (2013.01); *G06K 15/1817* (2013.01); *G06K 15/1823* (2013.01)
(58) Field of Classification Search
  USPC ....................... 358/1.12, 1.13–1.15; 399/9, 24
  See application file for complete search history.

(56) References Cited

U.S. PATENT DOCUMENTS

2004/0085565 A1* 5/2004 Owen et al. ................... 358/1.14
2008/0080003 A1* 4/2008 Ferlitsch et al. .............. 358/1.16
2008/0192281 A1* 8/2008 Hagiwara ..................... 358/1.15

FOREIGN PATENT DOCUMENTS

JP 2009-137202 6/2009

* cited by examiner

*Primary Examiner* — Barbara Reiner
*Assistant Examiner* — Kent Yip
(74) *Attorney, Agent, or Firm* — Wenderoth, Lind & Ponack, L.L.P.

(57) ABSTRACT

An image forming device includes a residual paper amount detecting unit, a first execution unit and a second execution unit. The residual paper amount detecting unit is configured to detect a residual paper amount of a paper feeding cassette which retains papers. The first execution unit is configured to, if the number of papers required in executing an initially-inputted earliest job among a plurality of print jobs is more than the residual paper amount detected by the residual paper amount detecting unit, execute printing of a predetermined minimum number of printing papers in the earliest job. The second execution unit is configured to, after the printing of the minimum number of printing papers is executed by the first execution unit, execute one of the print jobs satisfying a predetermined priority condition.

4 Claims, 4 Drawing Sheets

Fig.4

| No. | PRINT JOB | NECESSARY NUMBER OF PRINTING PAPERS |
|---|---|---|
| 1 | J1 | 50 |
| 2 | J2 | 10 |
| 3 | J3 | 40 |
| ... | ... | ... |

IMAGE FORMING APPARATUS, NON-TRANSITORY COMPUTER-READABLE RECORDING MEDIUM STORING AN IMAGE FORMING PROGRAM, AND IMAGE FORMING METHOD

CROSS-REFERENCE TO RELATED APPLICATION(S)

This application is based upon and claims the benefit of priority from Japanese Patent Application(s) No. 2012-283734 filed on Dec. 26, 2012, the entire contents of which are incorporated herein by reference.

BACKGROUND

The technology of the present disclosure relates to a method of controlling execution procedures of a plurality of print jobs in an image forming device.

In an image forming apparatus such as a printer, a copier, a facsimile machine or a multifunction peripheral, a plurality of print jobs is executed in an input order of the respective print jobs. In the meantime, there has been conventionally proposed a technique of detecting a residual paper amount of a paper feeding cassette and preferentially executing a printable print job among a plurality of print jobs depending on the residual paper amount.

SUMMARY

An image forming apparatus according to one aspect of the present disclosure includes a residual paper amount detecting unit, a first execution unit and a second execution unit. The residual paper amount detecting unit is configured to detect a residual paper amount of a paper feeding cassette which retains papers. The first execution unit is configured to, if the number of papers required in executing an initially-inputted earliest job among a plurality of print jobs is more than the residual paper amount detected by the residual paper amount detecting unit, execute printing of a predetermined minimum number of printing papers in the earliest job. The second execution unit is configured to, after the printing of the minimum number of printing papers is executed by the first execution unit, execute one of the print jobs satisfying a predetermined priority condition.

A non-transitory computer-readable recording medium storing an image forming program according to another aspect of the present disclosure is configured such that the image forming program causes a computer to execute a residual paper amount detecting step, a first execution step and a second execution step. The residual paper amount detecting step detects a residual paper amount of a paper feeding cassette which retains papers. If the number of papers required in executing an initially-inputted earliest job among a plurality of print jobs is more than the residual paper amount detected in the residual paper amount detecting step, the first execution step executes printing of a predetermined minimum number of printing papers in the earliest job. After the printing of the minimum number of printing papers is executed in the first execution step, the second execution step executes one of the print jobs satisfying a predetermined priority condition.

An image forming method according to a further aspect of the present disclosure is a method for executing a residual paper amount detecting step, a first execution step and a second execution step using a computer configured to control an image forming device. The residual paper amount detecting step detects a residual paper amount of a paper feeding cassette which retains papers. If the number of papers required in executing an initially-inputted earliest job among a plurality of print jobs is more than the residual paper amount detected in the residual paper amount detecting step, the first execution step executes printing of a predetermined minimum number of printing papers in the earliest job. After the printing of the minimum number of printing papers is executed in the first execution step, the second execution step executes one of the print jobs satisfying a predetermined priority condition.

BRIEF DESCRIPTION OF THE DRAWINGS

FIG. 4 is a view showing one example of a standby state of print jobs.

DETAILED DESCRIPTION

An embodiment will now be described with reference to the accompanying drawings.

[Multifunction Peripheral 10]

Figure 1A:
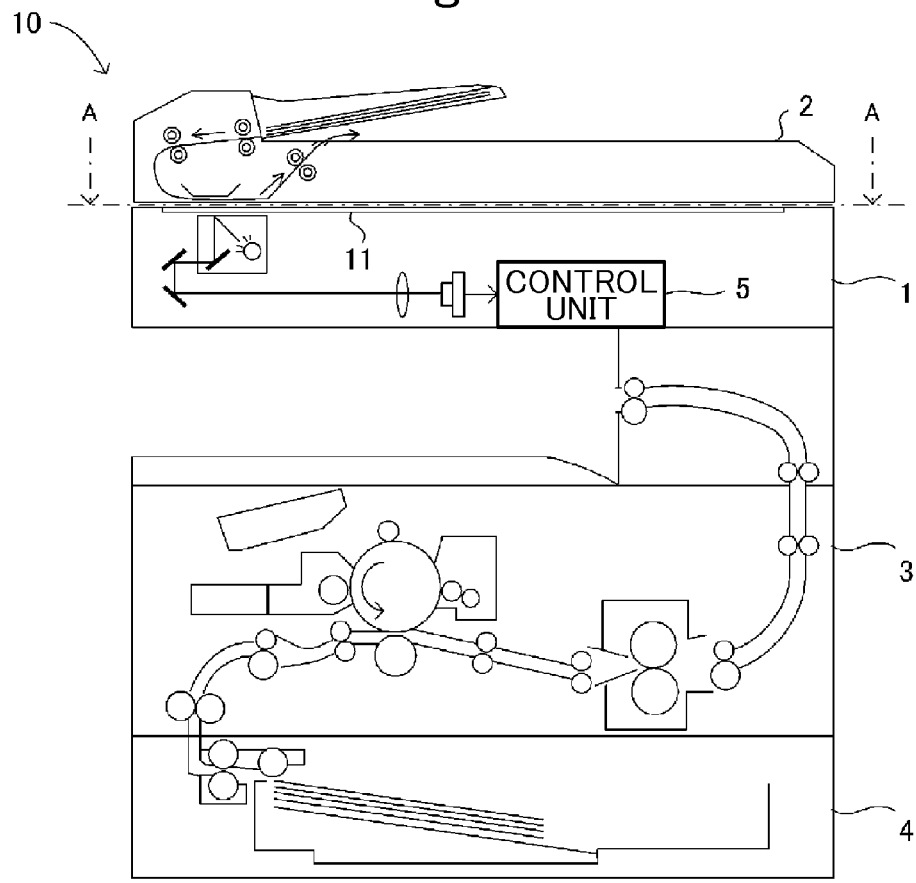
FIG. 1A is a configuration view showing a multifunction peripheral according to one embodiment.
Figure 1B:
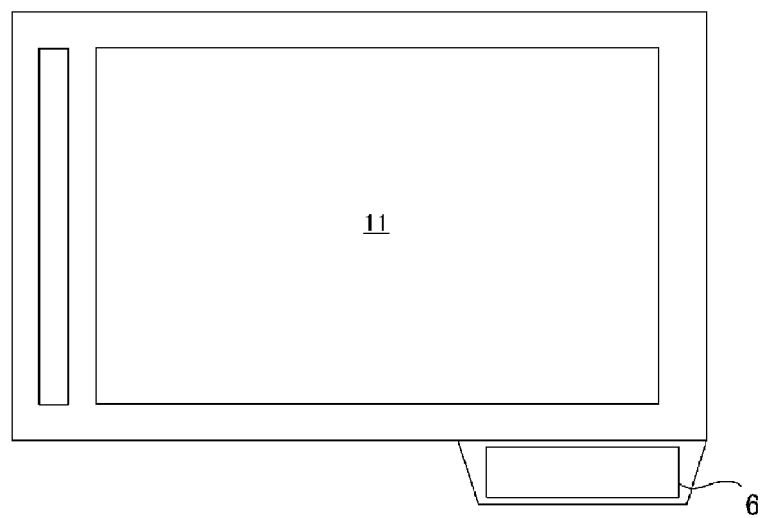
FIG. 1B is a sectional view taken along line A-A in FIG. 1A.
Figure 2:
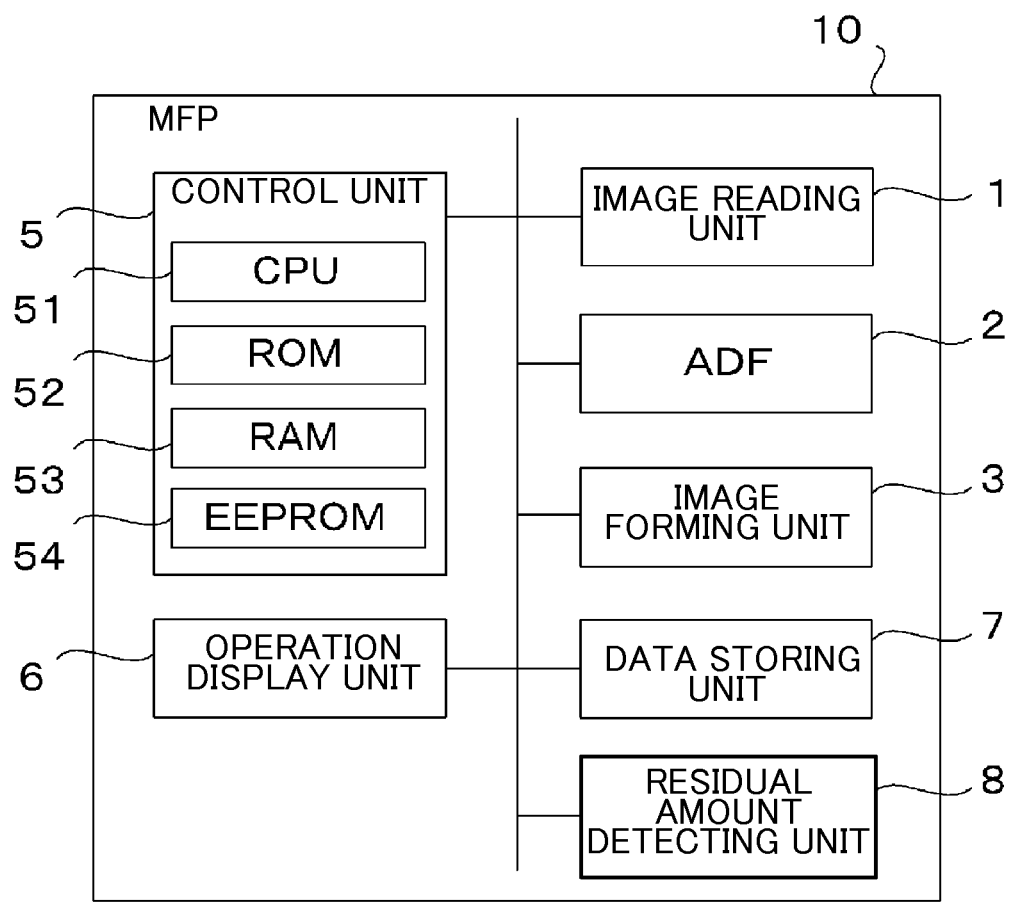
FIG. 2 is a block diagram showing a system configuration of the multifunction peripheral according to one embodiment.

Referring first to FIGS. 1 and 2, description will be made on an outlined configuration of a multifunction peripheral 10 according to one embodiment. FIG. 1A is a schematic view showing the outlined configuration of the multifunction peripheral 10. FIG. 1B is a sectional view taken along line A-A in FIG. 1A.

As shown in FIGS. 1 and 2, the multifunction peripheral 10 is an image forming apparatus that includes an image reading unit 1, an ADF 2, an image forming unit 3, a paper feeding cassette 4, a control unit 5, an operation display unit 6, a data storing unit 7, a residual amount detecting unit 8, and so forth. The technology of the present disclosure is not limited to the multifunction peripheral but can be applied to image forming devices such as a printer, a copier and a facsimile machine.

The image reading unit 1 includes a CCD (an imaging means) and different kinds of optical elements. The image reading unit 1 performs an image reading process in which image data are read from a manuscript set on a manuscript stand 11 or the ADF 2. The image data read by the image reading unit 1 are stored in the data storing unit 7. The ADF 2 automatically conveys a manuscript through a position where an image is read by the image reading unit 1.

The image forming unit 3 is, e.g., an electro-photography type image forming means that includes a photosensitive drum, an exposure device (LSU), a charging device, a developing device, a transfer device, a fixing device, and so forth. The image forming unit 3 performs an image forming process in which an image originating from image data read by the image reading unit 1 or image data stored in the data storing unit 7 is formed on a paper supplied from the paper feeding cassette 4. The image forming unit 3 may be a print type image forming means such as an ink jet recording apparatus or the like.

The operation display unit 6 is provided with a display unit and an operation unit. The display unit includes a liquid crystal display that displays different kinds of information based on a control instruction transmitted from the control unit 5. The operation unit includes an operation button and a touch panel for receiving different kinds of input operations inputted by a user.

The control unit 5 is a computer that includes control devices such as a CPU 51, a ROM 52, a RAM 53 and an EEPROM 54 and controls the operation of the multifunction peripheral 10. More specifically, the control unit 5 enables the multifunction peripheral 10 to perform a scanning process, a printing process, a copying process, a faxing process and the like by causing the CPU 51 to execute different kinds of control programs pre-stored in the ROM 52 or the data storing unit 7. The RAM 53 is a volatile memory and the EEPROM 54 is a nonvolatile memory. The RAM 53 and the EEPROM 54 are used as temporary storage memories or image memories for storing different kinds of processes executed by the CPU 51. The control unit 5 may be formed of an electronic circuit such as an integrated circuit (ASIC or DSP) or the like.

The data storing unit 7 is a solid state drive (SSD), a hard disk drive (HDD) or the like. A print control program for causing the CPU 51 of the control unit 5 to execute a below-mentioned print control process (see a flowchart shown in FIG. 3) is pre-stored in the data storing unit 7. The print control program is recorded in a non-transitory computer-readable recording medium such as a CD, a DVD, a flash memory or the like and may be installed from the recording medium onto the data storing unit 7.

Image data read by the image reading unit 1 and image data transmitted from an information processing device such as a personal computer (not shown) or the like connected to the multifunction peripheral 10 in a communicating manner are stored in the data storing unit 7. The control unit 5 executes print jobs by which the image data stored in the data storing unit 7 are printed in the image forming unit 3. The print jobs includes a printer job for printing manuscript data inputted from the information processing device, a copying job for printing manuscript data read by the image reading unit 1, and a facsimile receiving job for printing manuscript data received by facsimile communication.

A predetermined minimum number of printing papers N1 is stored in the data storing unit 7. The minimum number of printing papers N1 is set to establish a priority of an earliest job having an earliest input order among a plurality of print jobs. The minimum number of printing papers N1 is the information that indicates a minimum number of papers printed in the earliest job. For example, on an initial setting screen of the multifunction peripheral 10, the minimum number of printing papers N1 is pre-set by the control unit 5 in response to a user's operation of the operation display unit 6. In the present embodiment, it is assumed that the minimum number of printing papers N1 is pre-set to become equal to 10.

The paper feeding cassette 4 is capable of retaining a plurality of papers. The residual amount detecting unit 8 is used when the control unit 5 detects a residual amount of papers retained in the paper feeding cassette 4.

For example, the residual amount detecting unit 8 is provided with an optical sensor that detects a vertical position of a lift plate on which papers are mounted within the paper feeding cassette 4. Thus, the control unit 5 can detect the residual amount of papers retained in the paper feeding cassette 4, based on the vertical position of the lift plate detected by the residual amount detecting unit 8 and the kind of papers retained in the paper feeding cassette 4. The control unit 5 used to detect the residual paper amount of the paper feeding cassette 4 corresponds to a residual paper amount detecting unit. The residual paper amount detecting method is not limited thereto. Various kinds of conventional techniques may be employed. For example, it is thinkable that the control unit 5 detects the residual paper amount within the paper feeding cassette 4 depending on the time required in elevating the lift plate after the paper feeding cassette 4 is mounted to the multifunction peripheral 10 and, then, detects the residual paper amount by subtracting the number of printed papers from the previously detected residual paper amount.

In the multifunction peripheral 10, the control unit 5 executes the print control process to be described later, whereby the execution order of a plurality of print jobs is changed depending on the necessary number of printing papers required in executing the respective print jobs and the current residual paper amount of the paper feeding cassette 4.

[Print Control Process]

Figure 3:
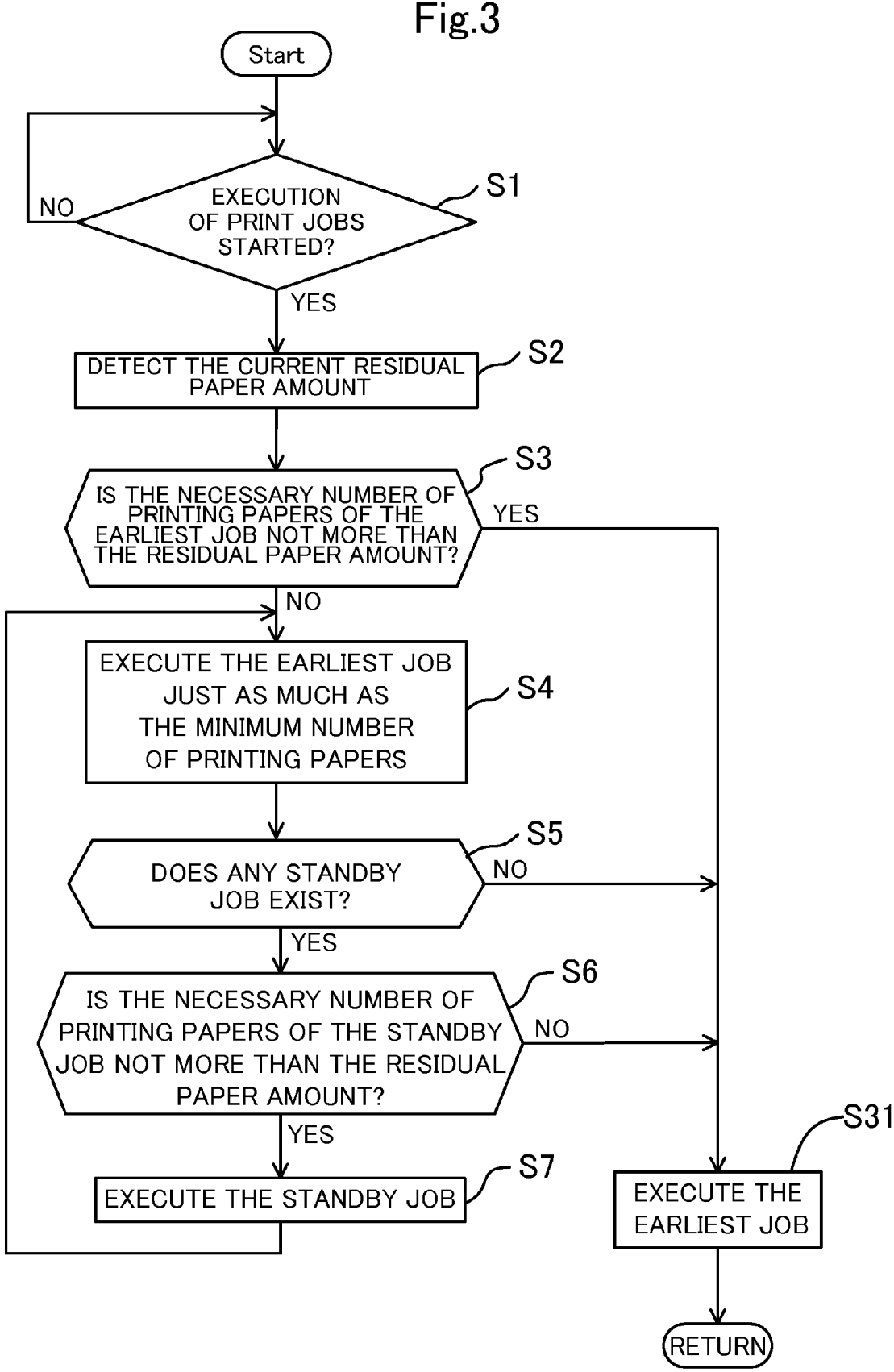
FIG. 3 is a flowchart for explaining one example of procedures of a print control process.

One example of procedures of a print control process executed by the control unit 5 according to the image forming program will now be described with reference to the flowchart shown in FIG. 3. The respective procedures executed by the control unit 5 will be called steps S1, S2, etc. The technology of the present disclosure can be perceived as a non-transitory computer-readable recording medium that stores an image forming program for causing the control unit 5 to execute the respective procedures of the print control process or as an image forming method in which the respective procedures of the print control process are executed by the control unit 5.

<Step S1>

First, in step S1, the control unit 5 waits for the start of execution of print jobs requested to the multifunction peripheral 10 (No in step S1). If the timing for the start of execution of print jobs arrives (if Yes in step S1), the control unit 5 causes the process to proceed to step S2.

More specifically, if the currently-executed print job among a plurality of print jobs requested to the multifunction peripheral 10 is finished, the control unit 5 determines that the timing for the start of execution of the next print job has arrived.

<Step S2>

In step S2, the control unit 5 executes a residual paper amount detecting step in which the residual paper amount of the paper feeding cassette 4 is detected by the residual amount detecting unit 8. Hereinafter, the residual paper amount of the paper feeding cassette 4 thus detected will be called a residual paper amount N11.

<Step S3>

In step S3, the control unit 5 determines whether the necessary number of printing papers required in executing a print job having an earliest input order (hereinafter referred to as an "earliest job") among the waiting print jobs is left in the paper feeding cassette 4. More specifically, if the necessary number of printing papers required in executing the earliest job is assumed to be N21, the control unit 5 determines whether the necessary number of printing papers N21 is not more than the residual paper amount N11. The control unit 5 determines the existence or absence of the print jobs and the necessary number of printing papers of each of the print jobs based on the spool information stored in the RAM 53, the EEPROM 54 or the like. The spool information includes the information on different kinds of jobs requested to the multifunction peripheral 10.

If it is determined that the necessary number of printing papers N21 is not more than the residual paper amount N11 (if Yes in step S3), the control unit 5 causes the process to proceed to step S31. On the other hand, if the necessary number of printing papers N21 is more than the residual paper amount N11 (if No in step S3), the control unit 5 causes the process to proceed to step S4.

<Step S4>

In step S4, the control unit 5 executes printing of the minimum number of printing papers N1 in the earliest job and then keeps the earliest job on standby. Thus, a user who has requested the multifunction peripheral 10 to execute the earliest job can preferentially obtain the print result just as much as the minimum number of printing papers N1 in the earliest job.

The control unit 5 which performs steps S3 and S4 to preferentially execute printing of the minimum number of printing papers N1 in case where the necessary number of printing papers N21 is more than the current residual paper amount N11 corresponds to a first execution unit. Steps S3 and S4 correspond to a first execution step.

<Step S5>

In step S5, the control unit 5 determines whether other print jobs (hereinafter referred to as "standby jobs") exist after the earliest job.

If it is determined that the standby jobs exist (if Yes in step S5), the control unit 5 causes the process to proceed to step S6. On the other hand, if the standby jobs do not exist (if No in step S5), the control unit 5 causes the process to proceed to step S31.

<Step S6>

In step S6, the control unit 5 determines whether the standby job having an earlier input order among the standby jobs satisfies a predetermined priority condition. More specifically, the control unit 5 determines whether the necessary number of printing papers required in executing the standby job is left in the paper feeding cassette 4. That is to say, if the necessary number of printing papers required in executing the standby job is assumed to be N22 and if the current residual paper amount of the paper feeding cassette 4 is assumed to be N12, the control unit 5 determines whether the necessary number of printing papers N22 is not more than the residual paper amount N12. One example of the priority condition is that the necessary number of printing papers N22 is not more than the residual paper amount N12. The control unit 5 detects the residual paper amount N12 by subtracting the minimum number of printing papers N1 from the residual paper amount N11 or by using the residual amount detecting unit 8. After executing the standby job, the control unit 5 detects a current residual paper amount N13 by subtracting the necessary number of printing papers N22 from the residual paper amount N12 or by using the residual amount detecting unit 8.

If it is determined that necessary number of printing papers N22 is not more than the residual paper amount N12 (if Yes in step S6), the control unit 5 causes the process to proceed to step S7. On the other hand, if the necessary number of printing papers N22 is more than the residual paper amount N12 (if No in step S6), the control unit 5 causes the process to proceed to step S31.

<Step S7>

In step S7, the control unit 5 executes the standby job prior to the earliest job and then causes the process to proceed to step S5. Thus, the control unit 5 executes the same process with respect to the next standby job. Consequently, the respective standby jobs executable within the extent of the current residual paper amount N12 can be sequentially finished in the input order thereof.

The control unit 5 which performs steps S5 to S7 to execute the standby job satisfying the priority condition after execution of the printing of the minimum number of printing papers N1 of the earliest job corresponds to a second execution unit. Steps S5 to S7 correspond to a first execution step.

As another embodiment, it is thinkable that, if it is determined in step S6 that the necessary number of printing papers N22 is more than the residual paper amount N12 (if No in step S6), the control unit 5 returns the process to step S5 and executes the same process with respect to the next standby job. In this embodiment, if another standby job executable within the extent of the current residual paper amount N12 exists, the standby job can be finished in a switched execution order.

<Step S31>

In the meantime, if it is determined in step S3 that the necessary number of printing papers N21 is not more than the residual paper amount N11 (if Yes in step S3), the control unit 5 executes the earliest job in step S31. Thus, in case where the necessary number of printing papers N21 is not more than the residual paper amount N11, the earliest job is executed with no exhaustion of papers.

If the necessary number of printing papers N21 is more than the residual paper amount N11 (if No in step S3) and if the standby job does not exist (if No in step S5), the earliest job stopped in step S4 is resumed by the control unit 5 in step S31. In this case, the earliest job is executed until the residual paper amount of the paper feeding cassette 4 becomes zero.

Similarly, if the necessary number of printing papers N21 is more than the residual paper amount N11 (if No in step S3) and if the necessary number of printing papers N22 is more than the residual paper amount N12 (if No in step S6), the earliest job is resumed by the control unit 5 in step S31. As described above, in the print control process, when it is determined that the necessary number of printing papers N22 of the standby job is more than the residual paper amount N12 (when No in step S6), the earliest job is resumed without determining the feasibility of execution of another standby job. Accordingly, in the print control process, the determination as to whether the standby jobs satisfy the priority condition is made in the earlier input order. When it is initially determined that the priority condition is not satisfied (when No in step S6), the earliest job is resumed.

As a further embodiment, it is conceivable that the control unit 5 determines, in an earlier input order of a plurality of standby jobs, whether the standby jobs satisfy the priority condition, and then executes the standby jobs (steps S5 to S7) and that, when it is initially determined that the priority condition is not satisfied (when No in step S6), the printing of a predetermined second minimum number of printing papers is executed in the standby job which is determined not to satisfy the priority condition. The second minimum number of printing papers may be equal to the minimum number of printing papers N1 or may be pre-set in a number differing from the minimum number of printing papers N1. After printing the second minimum number of printing papers, it is thinkable that the same process is executed with respect to another standby job or that the earliest job is resumed. The printing of the residual number of papers that remains after second minimum number of printing papers has been printed in the standby job is resumed after executing the earliest job.

As a still further embodiment, it is conceivable that, if another print job is newly added during execution of the earliest job in step S31, the earliest job is temporarily stopped and the process is caused to proceed to step S5. In this embodiment, if the necessary number of printing papers of another print job added during execution of the earliest job is small, the print job can be executed prior to the earliest job.

[Operation Example of the Print Control Process]

Referring now to FIG. 4, an operation example of the print control process will be described. FIG. 4 is a view showing one example of a standby state of print jobs inputted to the multifunction peripheral 10.

Description will now be made on an operation in case where the print control process is started by the control unit 5 while three print jobs J1 to J3 wait in the multifunction peripheral 10. The necessary number of printing papers N21 of the first print job J1 is 50. The necessary number of printing papers N22 of the next print job J2 is 10. The necessary number of printing papers N23 of the last print job J3 is 40. The residual paper amount N11 of the paper feeding cassette 4 is assumed to be 30.

In this case, the control unit 5 executes printing just as much as the minimum number of printing papers N1 (10 sheets) in the print job J1 (S4), because the necessary number of printing papers N21 (50 sheets) of the print job J1 is larger than the residual paper amount N11 (No in step S3). Thus, the priority of the print job J1 which is the earliest job among the print jobs J1 to J3 is established at least just as much as the printing amount of the minimum number of printing papers N1.

Thereafter, the control unit 5 executes the print job J2 (S7), because the print job J2 exists (Yes in step S5) and because the necessary number of printing papers N22 (10 sheets) of the print job J2 is not more than the current residual paper amount N12 (20 sheets) (Yes in step S6). That is to say, the print job J2 is executed prior to the print job J1.

Next, the control unit 5 resumes the print job J1 without executing the print job J3 (S31), because the print job J3 exists (Yes in step S5) and because the necessary number of printing papers N23 (40 sheets) of the print job J3 is more than the current residual paper amount N13 (10 sheets) (No in step S6). In this way, if the print job J3 cannot be executed within the extent of the residual paper amount N13, the print job J3 is not executed prior to the print job J1.

In the print control process, it is often the case that the standby job is executed during the earliest job and that the earliest job is resumed after execution of the standby job. For that reason, it is preferred that the multifunction peripheral 10 discharges the printed matters of different print jobs executed in the print control process, in such a way that the printed matters can be distinguished from one another on a job-by-job basis.

For example, if there is provided a plurality of discharge trays to which the printed matters printed by the image forming unit 3 are discharged, it is conceivable that the control unit 5 changes the discharge trays on a job-by-job basis. If the multifunction peripheral 10 includes a paper discharge mechanism for discharging the printed matters printed by the image forming unit 3 in a way that the printed matters are shifted by a predetermined amount in a direction perpendicular to the conveying direction thereof, it is conceivable that the control unit 5 causes the paper discharge mechanism to shift the discharge positions of the printed matters of different print jobs by a predetermined amount. In addition, if the multifunction peripheral 10 includes a rotary paper discharge mechanism for discharging the printed matters printed by the image forming unit 3 in a way that the printed matters are rotated 90° to have different paper orientations, it is conceivable that the control unit 5 causes the rotary paper discharge mechanism to alternately change the orientations of the printed matters of different print jobs by 90°. By discharging the printed matters of different print jobs in such a state that the printed matters can be distinguished from one another as described above, the printed matters of different print jobs are prevented from being mixed with one another. The control unit 5 used to execute these paper discharge processes corresponds to a paper discharge control unit.

While the present embodiment has been described by taking, as an example, a case where the paper feeding cassette 4 is single, it is thinkable to employ a configuration in which a plurality of paper feeding cassettes 4 is provided. In this case, the control unit 5 may execute the print control process with respect to each of the paper feeding cassettes 4. In a configuration in which, if the residual paper amount of any one of the paper feeding cassettes 4 becomes zero, another paper feeding cassette 4 is alternatively used, it is conceivable that the print control process is executed using the total residual paper amount of the paper feeding cassettes 4 as a determination index.

What is claimed is:

1. An image forming apparatus, comprising:
    a residual paper amount detecting unit configured to detect a residual paper amount of a paper feeding cassette which retains papers;
    a data storing unit which stores a predetermined minimum number of printing papers of an initially-inputted earliest job among a plurality of print jobs;
    a first execution unit configured to, if a number of papers required in executing the earliest job among the plurality of print jobs is more than the residual paper amount detected by the residual paper amount detecting unit, execute printing of the predetermined minimum number of printing papers, which is stored in the data storing unit, in the earliest job; and
    a second execution unit configured to, after the printing of the predetermined minimum number of printing papers is executed by the first execution unit, execute one of the print jobs satisfying a predetermined priority condition, which requires that a number of papers required in executing the print jobs be not more than a current residual paper amount of the paper feeding cassette,
    wherein the second execution unit determines, in an earlier input order of the print jobs, whether the print jobs satisfy the predetermined priority condition, and then executes the print jobs, and
    wherein, when it is initially determined that the predetermined priority condition is not satisfied, the second execution unit resumes the earliest job.

2. The apparatus of claim 1, further comprising:
    a paper discharge control unit configured to discharge printed matters of different print jobs executed by the first execution unit and the second execution unit, in such a way that the printed matters are distinguished from one another.

3. A non-transitory computer-readable recording medium storing an image forming program which causes a computer to execute:
    a residual paper amount detecting step for detecting a residual paper amount of a paper feeding cassette which retains papers;
    a first execution step for, if a number of papers required in executing an initially-inputted earliest job among a plurality of print jobs is more than the residual paper amount detected in the residual paper amount detecting step, executing printing of a predetermined minimum number of printing papers in the earliest job; and
    a second execution step for, after the printing of the predetermined minimum number of printing papers is executed in the first execution step, executing one of the print jobs satisfying a predetermined priority condition, which requires that a number of papers required in executing the print jobs be not more than a current residual paper amount of the paper feeding cassette, wherein the second execution unit determines, in an earlier input order of the print jobs, whether the print jobs satisfy the predetermined priority condition, and then executes the print jobs, and wherein, when it is initially determined that the predetermined priority condition is not satisfied, the second execution unit resumes the earliest job.

4. An image forming method for, by a computer configured to control an image forming apparatus, executing:

a residual paper amount detecting step for detecting a residual paper amount of a paper feeding cassette which retains papers;

a first execution step for, if a number of papers required in executing an initially-inputted earliest job among a plurality of print jobs is more than the residual paper amount detected in the residual paper amount detecting step, executing printing of a predetermined minimum number of printing papers in the earliest job; and a second execution step for, after the printing of the predetermined minimum number of printing papers is executed in the first execution step, executing one of the print jobs satisfying a predetermined priority condition, which requires that a number of papers required in executing the print jobs be not more than a current residual paper amount of the paper feeding cassette, wherein the second execution unit determines, in an earlier input order of the print jobs, whether the print jobs satisfy the predetermined priority condition, and then executes the print jobs, and wherein, when it is initially determined that the predetermined priority condition is not satisfied, the second execution unit resumes the earliest job.

* * * * *